US010590226B2

United States Patent
Matner et al.

(10) Patent No.: US 10,590,226 B2
(45) Date of Patent: *Mar. 17, 2020

(54) SOLIDS BASED ON POLYISOCYANURATE POLYMERS PRODUCED UNDER ADIABATIC CONDITIONS

(71) Applicant: Covestro Deutschland AG, Leverkusen (DE)

(72) Inventors: Mathias Matner, Neuss (DE); Dirk Achten, Leverkusen (DE); Hans-Josef Laas, Odenthal (DE); Heiko Hocke, Shanghai (CN); Dieter Mager, Leverkusen (DE)

(73) Assignee: Covestro Deutschland AG, Leverkusen (DE)

( * ) Notice: Subject to any disclaimer, the term of this patent is extended or adjusted under 35 U.S.C. 154(b) by 85 days.

This patent is subject to a terminal disclaimer.

(21) Appl. No.: 15/568,086

(22) PCT Filed: Apr. 21, 2016

(86) PCT No.: PCT/EP2016/058901
§ 371 (c)(1),
(2) Date: Oct. 20, 2017

(87) PCT Pub. No.: WO2016/170057
PCT Pub. Date: Oct. 27, 2016

(65) Prior Publication Data
US 2018/0142056 A1    May 24, 2018

(30) Foreign Application Priority Data

Apr. 21, 2015  (EP) .................................... 15164518

(51) Int. Cl.
| | |
|---|---|
| C08G 18/79 | (2006.01) |
| C08G 18/02 | (2006.01) |
| C08G 18/72 | (2006.01) |
| C08G 18/73 | (2006.01) |
| C08G 18/75 | (2006.01) |
| C08G 18/78 | (2006.01) |
| C08G 18/09 | (2006.01) |
| C08G 18/22 | (2006.01) |
| C08G 18/32 | (2006.01) |

(52) U.S. Cl.
CPC ......... *C08G 18/022* (2013.01); *C08G 18/092* (2013.01); *C08G 18/225* (2013.01); *C08G 18/3206* (2013.01); *C08G 18/725* (2013.01); *C08G 18/73* (2013.01); *C08G 18/755* (2013.01); *C08G 18/7831* (2013.01); *C08G 18/791* (2013.01); *C08G 18/792* (2013.01)

(58) Field of Classification Search
CPC combination set(s) only.
See application file for complete search history.

(56) References Cited

U.S. PATENT DOCUMENTS

| | | |
|---|---|---|
| 3,211,703 A | 10/1965 | Gilman et al. |
| 3,330,828 A | 7/1967 | Grogler et al. |
| 3,487,080 A | 12/1969 | Matsui et al. |
| 3,640,937 A | 2/1972 | Thoma et al. |
| 3,640,967 A | 2/1972 | König et al. |
| 3,658,746 A | 4/1972 | Rosendahl et al. |
| 3,996,223 A | 12/1976 | Gupta et al. |

(Continued)

FOREIGN PATENT DOCUMENTS

| | | |
|---|---|---|
| CA | 2034622 A1 | 8/1991 |
| CA | 2139535 A1 | 8/1995 |

(Continued)

OTHER PUBLICATIONS

Cinnamon, S., et al., "Adhesion Properties of Poly(Hexamethylene Diisocyanate) Obtained by Organotin Catalysis", European Polymer Journal, 1908, vol. 16, pp. 147-148.

Dabi, S., et al., "Foam Polymerization of Hexamethylene Diisocyanate by Cobalt Naphthenate", European Polymer Journal, 1982, vol. 18, pp. 549-553.

Dabi, S., et al., "Oligotrimerization of Hexamethylene Diisocyanate by Organometiallic Catalysts", European Polymer Journal, 1980, vol. 16, pp. 831-833.

Flipsen, T., "Design, Synthesis and Properties of New Materials Based on Densely Crosslinked Polymers for Polymer Optical Fiber and Amplifier Applications", Rijksuniversiteit Groningen, University of Groningen, 2000, pp. 1-231.

(Continued)

*Primary Examiner* — Michael L Leonard
(74) *Attorney, Agent, or Firm* — Drinker Biddle & Reath LLP

(57) ABSTRACT

The invention relates to a process for producing solids made from polyisocyanurate plastics, comprising the following steps: (a) providing a polyisocyanate composition A) which contains oligomeric polyisocyanates and is low in monomeric polyisocyanates, where the isocyanurate structure content in the polyisocyanate composition A) is at least 50 mol %, based on the sum total of the oligomeric structures from the group consisting of uretdione, isocyanurate, allophanate, biuret, iminooxadiazinedione and oxadiazinetrione structure that are present in the polyisocyanate composition A); (b) catalytically trimerizing the polyisocyanate composition A), where (i) the catalytic trimerization is conducted at ambient temperatures of at least 80° C.; (ii) the catalytic trimerization is conducted within less than 2 hours at least up to a conversion level at which only at most 20% of the isocyanate groups originally present in the polyisocyanate composition A) are present; (iii) the catalytic trimerization takes place under quasi-adiabatic conditions which are characterized in that the material temperature at least one juncture is at least 10° C. above ambient temperature. The invention further relates to solids made from polyisocyanurate plastic, obtainable by the process of the invention.

17 Claims, No Drawings

(56) References Cited

U.S. PATENT DOCUMENTS

| | | | |
|---|---|---|---|
| 4,040,992 A | 8/1977 | Bechara et al. | |
| 4,255,569 A | 3/1981 | Müller et al. | |
| 4,288,586 A | 9/1981 | Bock et al. | |
| 4,324,879 A | 4/1982 | Bock et al. | |
| 4,379,905 A | 4/1983 | Stemmler et al. | |
| 4,419,513 A | 12/1983 | Breidenbach et al. | |
| 4,487,928 A | 12/1984 | Richter et al. | |
| 4,499,253 A | 2/1985 | Kerimis et al. | |
| 4,604,418 A | 8/1986 | Shindo et al. | |
| 4,613,686 A | 9/1986 | König et al. | |
| 4,789,705 A | 12/1988 | Kase et al. | |
| 4,808,691 A | 2/1989 | König et al. | |
| 4,837,359 A | 6/1989 | Woynar et al. | |
| 4,960,848 A | 10/1990 | Scholl et al. | |
| 4,994,541 A | 2/1991 | Dell et al. | |
| 5,013,838 A | 5/1991 | Scholl | |
| 5,064,960 A | 11/1991 | Pedain et al. | |
| 5,076,958 A | 12/1991 | Pedain et al. | |
| 5,489,663 A | 2/1996 | Brandt et al. | |
| 5,914,383 A | 6/1999 | Richter et al. | |
| 6,090,939 A | 7/2000 | Richter et al. | |
| 6,133,397 A | 10/2000 | O'Connor et al. | |
| 6,251,985 B1 | 6/2001 | Wamprecht et al. | |
| 6,613,863 B2 | 9/2003 | Kohlstruk et al. | |
| 6,635,761 B1 | 10/2003 | Revelant et al. | |
| 6,765,111 B1 | 7/2004 | Pedain et al. | |
| 8,119,799 B2 | 2/2012 | Binder et al. | |
| 9,376,403 B2 * | 6/2016 | Halpaap | C07D 251/34 |
| 9,631,043 B2 * | 4/2017 | Esbelin | C08G 18/4829 |
| 2010/0056702 A1 | 3/2010 | Grahl et al. | |
| 2013/0303758 A1 | 11/2013 | Lucas et al. | |
| 2015/0158966 A1 * | 6/2015 | Laas | C08G 18/73 528/407 |
| 2017/0044296 A1 | 2/2017 | Harada | |

FOREIGN PATENT DOCUMENTS

| | | |
|---|---|---|
| CA | 2244486 A1 | 2/1999 |
| CA | 2253119 A1 | 5/1999 |
| DE | 1570540 A1 | 3/1970 |
| DE | 1954093 A1 | 6/1970 |
| DE | 1902931 A1 | 8/1970 |
| DE | 1918204 A1 | 9/1970 |
| DE | 1670666 A1 | 7/1971 |
| DE | 1770245 A1 | 10/1971 |
| DE | 1770591 A1 | 11/1971 |
| DE | 1667309 A1 | 9/1972 |
| DE | 2414413 A1 | 10/1975 |
| DE | 2446440 A1 | 4/1976 |
| DE | 2452532 A1 | 5/1976 |
| DE | 2631733 A1 | 2/1977 |
| DE | 2641380 A1 | 3/1978 |
| DE | 3100263 A1 | 8/1982 |
| DE | 3219608 A1 | 9/1983 |
| DE | 3240613 A1 | 5/1984 |
| DE | 8711301 U1 | 10/1987 |
| DE | 3700209 A1 | 7/1988 |
| DE | 3717060 A1 | 12/1988 |
| DE | 3900053 A1 | 7/1990 |
| DE | 3928503 A1 | 3/1991 |
| DE | 10142816 A1 | 7/2002 |
| EP | 0003765 A1 | 9/1979 |
| EP | 0010589 A1 | 5/1980 |
| EP | 0013880 A1 | 8/1980 |
| EP | 0033581 A1 | 8/1981 |
| EP | 0047452 A1 | 3/1982 |
| EP | 0056158 A1 | 7/1982 |
| EP | 0056159 A1 | 7/1982 |
| EP | 0100129 A1 | 2/1984 |
| EP | 0102482 A2 | 3/1984 |
| EP | 0150769 A2 | 8/1985 |
| EP | 0330966 A2 | 9/1989 |
| EP | 0336205 A2 | 10/1989 |
| EP | 0339396 A1 | 11/1989 |
| EP | 0377177 A1 | 7/1990 |
| EP | 0379914 A2 | 8/1990 |
| EP | 0443167 A1 | 8/1991 |
| EP | 0496208 A2 | 7/1992 |
| EP | 0668271 A1 | 8/1995 |
| EP | 0671426 A1 | 9/1995 |
| EP | 0798299 A1 | 10/1997 |
| EP | 0896009 A1 | 2/1999 |
| EP | 0899282 A2 | 3/1999 |
| EP | 0916647 A2 | 5/1999 |
| EP | 0962455 A1 | 12/1999 |
| EP | 1229016 A2 | 8/2002 |
| EP | 1599526 A1 | 11/2005 |
| EP | 2159238 A1 | 3/2010 |
| EP | 2883895 A1 | 6/2015 |
| GB | 809809 A | 3/1959 |
| GB | 952931 A | 3/1964 |
| GB | 966338 A | 8/1964 |
| GB | 1145952 A | 3/1969 |
| GB | 1244416 A | 9/1971 |
| GB | 1335958 A | 10/1973 |
| GB | 1386399 A | 3/1975 |
| GB | 1391066 A | 4/1975 |
| GB | 1462597 A | 1/1977 |
| GB | 2221465 A | 2/1990 |
| GB | 2222161 A | 2/1990 |
| JP | 2001098042 A | 4/2001 |
| WO | WO-1999023128 A1 | 5/1999 |
| WO | WO-2004078820 A1 | 9/2004 |
| WO | WO-2005087828 A1 | 9/2005 |
| WO | WO-2013167404 A1 | 11/2013 |
| WO | WO-2015166983 A1 | 11/2015 |

OTHER PUBLICATIONS

Hakman, N., "Properties of Polyisocyanurate Resins Obtained by Polymerization of Hexamethylene Diisocyanate by Organotin Catalysts", European Polymer Journal, 1978, vol. 14, pp. 675-678.

Moritsugu, M., et al., "Cyclotrimerization of Diisocyanates Toward High-Performance Networked Polymers with Rigid Isocyanurate Structure: Combination of Aromatic and Aliphatic Diisocyanates for Tunable Flexibility", Journal of Polymer Science, 2013, vol. 51, pp. 2631-2637.

Schildknecht, C.E., et al., "Polymerization Processes", Wiley, New York, 1977, pp. 665-667.

International Preliminary Report on Patentability for PCT/EP2016/058901 dated Oct. 24, 2017.

International Preliminary Report on Patentability for PCT/EP2016/058902 dated Oct. 24, 2017.

International Preliminary Report on Patentability for PCT/EP2016/058904 dated Oct. 24, 2017.

International Preliminary Report on Patentability for PCT/EP2016/058905 dated Oct. 24, 2017.

International Preliminary Report on Patentability for PCT/EP2016/058906 dated Oct. 24, 2017.

International Search Report for PCT/EP2016/058901 dated Jun. 30, 2016.

International Search Report for PCT/EP2016/058902 dated Jul. 14, 2016.

International Search Report for PCT/EP2016/058904 dated Jul. 13, 2016.

International Search Report for PCT/EP2016/058905 dated Jul. 8, 2016.

International Search Report for PCT/EP2016/058906 dated Jul. 13, 2016.

Written Opinion of the International Searching Authority for PCT/EP2016/058901 dated Jun. 30, 2016.

Written Opinion of the International Searching Authority for PCT/EP2016/058902 dated Jul. 14, 2016.

Written Opinion of the International Searching Authority for PCT/EP2016/058904 dated Jul. 13, 2016.

Written Opinion of the International Searching Authority for PCT/EP2016/058905 dated Jul. 8, 2016.

(56) References Cited

OTHER PUBLICATIONS

Written Opinion of the International Searching Authority for PCT/EP2016/058906 dated Jul. 13, 2016.

* cited by examiner

SOLIDS BASED ON POLYISOCYANURATE POLYMERS PRODUCED UNDER ADIABATIC CONDITIONS

CROSS-REFERENCE TO RELATED APPLICATIONS

This application is a national stage application (under 35 U.S.C. § 371) of PCT/EP2016/058901, filed Apr. 21, 2016, which claims benefit of European Application No. 15164518.1, filed Apr. 21, 2015, both of which are incorporated herein by reference in their entirety.

BACKGROUND OF THE INVENTION

The invention relates to a process for producing solids made from polyisocyanurate plastics, and to the solids made from polyisocyanurate plastic obtainable therefrom.

Polymers having polyisocyanurate structure are known for their high thermal and flame stability. Polyisocyanurate-containing foams based on aromatic diphenylmethane 4,4'-diisocyanate (MDI), and also polyether polyols and polyepoxides, are in widespread use especially as high-performance insulation materials, for example because of their very low thermal conductivity. See C. E. Schildknecht and I. Skeist, *Polymerization Processes*, pp. 665-667, Wiley, New York (1977). However, the processes for producing such foams have multiple stages and are time-consuming. The need for blending with polyols or polyepoxides because of the incompatibility of the polyisocyanurates formed in their own starting materials limits the use thereof in high-temperature applications. Moreover, MDI polyisocyanurate-containing foams, as is commonly known from aromatic polyurethanes, have only a low light stability and have a tendency to severe yellowing.

There has therefore been no lack of attempts to synthesize polyisocyanurate plastics based on aliphatic light-resistant isocyanates.

For example, *European Polymer Journal, vol.* 16, 147-148 (1980) describes the catalytic trimerization of monomeric 1,6-diisocyanatohexane (HDI) at 40° C. to give a clear transparent polyisocyanurate plastic free of isocyanate groups. For this purpose, however, very high catalyst concentrations of dibutyltin methoxide as trimerization catalyst are required, and these have a severe adverse effect on the thermal stability and colour stability of the products. *European Polymer Journal, Vol.* 16, 831-833 (1980) describes the complete trimerization of monomeric HDI to give a polyisocyanurate at a temperature of 140° C. using 6% by weight of tributyltin oxide as catalyst.

The thesis *Theo Flipsen: "Design, synthesis and properties of new materials based on densely crosslinked polymers for polymer optical fiber and amplifier applications", Rijksuniversiteit Groningen,* 2000 describes the trimerization of monomeric HDI with a neodymium/crown ether complex as catalyst. The polyisocyanurate obtained, which is said to have good optical, thermal and mechanical properties, was studied in the context of the thesis for its suitability for optical applications, especially as polymeric optical fibres. Flipsen gives a detailed description of the prerequisites for clear non-yellowed polyisocyanurates. Explicit mention should be made here of avoidance of impurities, water, dimers, high catalyst concentration and high temperatures at the start of the reaction. Troublesome side reactions are reaction with water to give ureas, and of uretdiones to give carbodiimides with blister formation. According to Flipsen, only under ideal conditions with a soluble neodymium-crown ether catalyst and a preliminary reaction at 60° C. or room temperature and further reaction at temperatures of up to 140° C. are high-transparency polyisocyanurates having a glass transition temperature ($T_g$) of 140° C. obtained over a long period of greater than 24 h. A disadvantage of the process described is that it is a multistage process with a complicated reaction regime with problematic industrial scale implementation.

*Eur. Polym. J.* Vol. 18, pp. 549-553, 1982, describes a process for producing foams, wherein the trimerization is conducted of 100 g of HDI in the presence of 2% tributyltin oxide at 140° C. over 2 h with evaporative cooling up to conversions of about 50% and then cooled to 60° C. After adding 2.5% of an 8% solution of the cobalt naphthenate cocatalyst in DMSO and adding 8 g of Freon (blowing agent), the reaction commences at 60° C., exploiting the exothermicity of the reaction in order to increase the temperature of the mixture up to 200° C. within a few minutes. The mixture is subsequently kept at a constant temperature of 40° C. overnight. The conversions thus obtained vary in the region of 90%. The foams thus obtained were not examined any further for extractable components. The process described for production of polyisocyanurate foams is not implementable industrially on a large scale. The expected high HDI residual monomer content at 50% conversion and the very rapid onset reaction of the co-catalysed mixture with resulting temperatures of up to 200° C., in combination with a flashpoint of monomeric HDI of 140° C., lead to a mixture that cannot be processed safely under the typical foam production methods as a slabstock or belt foam.

The preparation of polyisocyanurates is described in the prior art mainly proceeding from liquid monomeric diisocyanates (e.g. stearyl diisocyanate, dodecyl diisocyanate, decyl diisocyanate, nonyl diisocyanate, octyl diisocyanate, HDI, BDI, PDI, IPDI, H12MDI, TDI, MDI, NDI, NBDI), of aliphatic and aromatic nature alike. The exothermicity of the trimerization reaction to give polyisocyanurates is so high (−75 kJ/mol of NCO) that a reaction proceeding from monomeric diisocyanates, particularly in the case of monomeric diisocyanates having a high isocyanate content (e.g. BDI, PDI, HDI, TIN), typically cannot be effected on the industrial scale and under adiabatic conditions as typically occur within solids in strongly exothermic polymerization processes, but only in small amounts of substance under strict temperature control.

An adiabatic change of state is a thermodynamic process in which a system is converted from one state to another without exchanging thermal energy with its environment. "Adiabatic conditions" is understood here to mean that complete dissipation of the heat of reaction released in the exothermic reaction to the environment is impossible. Thus, it is typically not possible to achieve homogeneous conditions in solids, and "adiabatic" conditions that occur particularly within the solids in the case of rapid reactions can lead to a local significant increase in temperature in the case of exothermic reaction. These local hotspots are extremely critical when the aim is the production of functionally homogeneous products.

A further problem is that aromatic monomeric diisocyanates and many arylaromatic or alicyclic monomeric diisocyanates can be homo- and co-trimerized only to low conversions. It is often necessary to add plasticizing or co-dissolving co-reactants. Otherwise, the reaction stops at high residual isocyanate contents and typically cloudy and discoloured products are obtained. The use of plasticizing and co-dissolving co-reactants is disadvantageous in turn since they lead to less chemically and thermally inert structural buildup elements such as allophanates, ureas, urethanes, thiourethanes and oxazolidinones, polyesters, polyethers, and at high temperatures to uretdiones with subsequent carbodiimidization and carbon dioxide elimination, and asymmetric isocyanurates. The production of polyisocyanurates having substantially or exclusively isocyanurate structures as structural buildup element is therefore impossible.

Temperature control in the production of polyisocyanurates having high conversion levels is of enormous significance since, because of the high isocyanate contents of the monomeric starting materials, under adiabatic conditions as typically exist in trimerizations in solids, and because of the exothermic reaction, temperatures of more than 300° C., i.e. above the flashpoint of monomeric HDI of 140° C. and the boiling point of monomeric HDI of 255° C., and even up to the self-ignition temperature of HDI of 454° C. can arise. Thus, the high temperatures can lead to direct breakdown of the products and even to in situ evaporation and self-ignition of the monomeric diisocyanates.

Aside from the occupational hygiene drawbacks resulting from the monomeric diisocyanates or breakdown products released, the formation of blisters at relatively high temperatures is very troublesome. Blisters are formed, for example, because of side reactions resulting from uretdione formation and subsequent carbodiimidization with elimination of carbon dioxide. The solids produced proceeding from monomeric diisocyanates therefore typically have blisters and thus cannot meet particular requirements relating to density, electrical insulation characteristics and mechanical properties.

Therefore, the only practical applications found by polyisocyanurates to date have typically been as crosslinking agents in paint chemistry, the preparation of which involves stopping the trimerization reaction at low conversions and removing excess unreacted monomeric diisocyanate. Thus, in the production of crosslinking agents based on monomeric isocyanurates, proceeding from aliphatic and mixed aliphatic and aromatic monomeric diisocyanates, DE 31 00 263; GB 952 931, GB 966 338; U.S. Pat. Nos. 3,211,703, 3,330,828 envisage conducting the reaction either in dilution or only up to low conversion values with very exact temperature control. There is deliberately no formation here of crosslinked polyisocyanurate plastics, but only of oligomeric, soluble products of low viscosity.

What is common to the abovementioned processes is that the trimerization is started at low temperatures. High trimerization temperatures, particularly at the start of the trimerization, can be controlled only with difficulty proceeding from monomeric diisocyanates, and lead to considerable side reactions in the form of uretdiones and carbodiimides, and are thus the cause of blister formation as a result of carbon dioxide elimination and discolouration of the product obtained. The only exception is trimerization in the presence of high concentrations of extremely slow-acting catalysts, for example tributyltin oxide. The typically multistage preliminary reactions thus conducted to give low isocyanate conversions of about 50% at temperatures above 100° C. are too costly and inconvenient for production of solids from polyisocyanurate plastic and are therefore of no interest on the industrial scale.

WO 2015/166983 discloses the use of isocyanurate polymers for encapsulating LEDs. Whereas the method of the present invention yields polyisocyanurate plastics with a good optical quality after curing times of as little as 15 minutes, the process described in WO 2015/166983 requires curing times of at least hour.

U.S. Pat. No. 6,133,397 only discloses coatings made by trimerizing oligomeric polyisocyanates. It does not disclose the production of solid bodies. What is also common to the processes described is that they are unsuitable for obtaining polyisocyanurate plastics in efficient industrial processes, particularly under adiabatic conditions as typically occur within solids in strongly exothermic reactions, especially those which are substantially free of troublesome defects in the form of discolouration, inhomogeneity and, for example, unwanted blisters. Nor is it possible in this way, by the processes known from the prior art, to effect polymerization at elevated temperatures in open reaction vessels without risking significant release of monomeric diisocyanates into the environment.

By contrast, industrially efficient processes are notable for high conversion rates and high process safety in terms of occupational hygiene.

The problem addressed by the invention was therefore that of developing an efficient industrial process for producing polyisocyanurates with a high conversion level for solids made from polyisocyanurate plastics which feature excellent weathering and chemical stability, and also high thermal stability and good mechanical properties. Ideally, these solids should lack defects such as blisters, streaks and discolouration.

BRIEF SUMMARY OF THE INVENTION

This object is achieved in accordance with the invention by the process specified in claim 1 for producing solids made from polyisocyanurate plastics, and by the solids made from polyisocyanurate plastic that are obtainable by the process and are specified in claim 11.

It has been found that, surprisingly, high-functionality liquid oligomeric polyisocyanates that are known as crosslinker raw materials in paint chemistry can be polymerized rapidly and efficiently even under adiabatic conditions to give polyisocyanurates having a high conversion level and excellent chemical stability, and also high thermal stability and good mechanical properties. When suitable oligomeric polyisocyanurates are used, even in an adiabatic temperature regime, side reactions that lead to blisters, inhomogeneities and discolourations are likewise substantially suppressed. The process of the invention allows the production of solids made from polyisocyanurates under adiabatic conditions without breakdown of the materials used or heating thereof above their flashpoints.

Compared to the processes known from the prior art for production of polyisocyanurates based on monomeric diisocyanates, it is possible in the process of the invention to greatly reduce environmental pollution with volatile isocyanates, even in the case of reaction in open vessels, or on surfaces and even at high trimerization temperatures. This is caused by the fact that significantly smaller amounts, if any, of monomeric diisocyanates are present in the reaction mixture. The process of the invention, even at the gel point, affords homogeneous products having a much lower concentration of extractable isocyanate-containing constituents. The gel point is understood to mean the juncture at which the crosslinking density in the reaction mixture is so far advanced that the viscosity of the reaction mixture rises abruptly and the reaction mixture gelates, i.e. no longer significantly deforms or flows. The processes described in the prior art reach the gel point only at much higher isocyanate conversions of well above 50%, since a crosslinking density sufficient for gelation, proceeding from monomeric diisocyanates having isocyanate functionalities of less than or equal to two, i.e. less than or equal to two isocyanate groups per molecule, is statistically achieved only at higher isocyanate conversions. By contrast, the use of oligomeric polyisocyanurates having isocyanate functionalities greater than two, i.e. more than two isocyanate groups per molecule, statistically results in a high crosslinking density at a much earlier stage, such that gelation of the reaction mixture is achieved at lower conversions and hence much earlier. Furthermore, the processes described in the prior art, even well after the gel point has been passed, still include extractable isocyanate-containing constituents.

Unlike the processes described in the prior art, the trimerization in the process of the invention can also be conducted at high temperatures above 80° C. With comparatively short reaction times below 2 h, it is possible by the process of the invention to obtain blister-free and transparent products having low discolouration.

Particularly advantageously, it is possible to conduct the trimerization at temperatures above the glass transition point of the desired products.

By the process of the invention, it is possible to obtain solids made from polyisocyanurate plastics which differ in physical terms, for example in terms of the glass transition temperature, from the products based on monomeric diisocyanates described in the prior art. Without wishing to be bound to scientific theories, this is probably based on structural differences in the nature and density of the crosslinking in the polyisocyanurate plastic obtained, which is attributable to the use of oligomeric polyisocyanates and to the particular reaction regime.

Advantageous configurations of the invention are specified in the dependent claims and are elucidated individually hereinafter, as is the general concept of the invention.

The invention thus provides a process for producing solids made from polyisocyanurate plastics, comprising the following steps:
- a) providing a polyisocyanate composition A) which contains oligomeric polyisocyanates and is low in monomeric polyisocyanates, where the isocyanurate structure content in the polyisocyanate composition A) is at least 50 mol %, based on the sum total of the oligomeric structures from the group consisting of uretdione, isocyanurate, allophanate, biuret, iminooxadiazinedione and oxadiazinetrione structure that are present in the polyisocyanate composition A);
- b) catalytically trimerizing the polyisocyanate composition A), where
  - (i) the catalytic trimerization is conducted at ambient temperatures of at least 80° C.;
  - (ii) the catalytic trimerization is conducted within less than 2 hours at least up to a conversion level at which only at most 20% of the isocyanate groups originally present in the polyisocyanate composition A) are present;
  - (iii) the catalytic trimerization takes place under quasi-adiabatic conditions which are characterized in that the material temperature at least one juncture is at least 10° C. above ambient temperature.

The invention further provides the solids made from polyisocyanurate plastics obtainable by the process.

DETAILED DESCRIPTION OF THE INVENTION

The invention described in detail hereinafter is based on the surprising observation that solids made from novel polyisocyanurate plastics can be obtained by catalytic trimerization of low-monomer oligomeric isocyanate compositions A) at ambient temperatures exceeding 80° C. with short reaction times of less than 2 h, these having many advantageous properties and especially being blister-free and transparent and exhibiting low colour numbers.

The use of low-monomer oligomeric polyisocyanate compositions rather than monomeric diisocyanates as starting materials for production of solids made from polyisocyanurate plastics additionally has the advantage that, because of the relatively low isocyanate contents of the oligomeric reactants, much less heat of reaction has to be dissipated during the curing, which especially enables a rapid trimerization reaction with short reaction times of less than 2 h and high temperatures exceeding 80° C. Moreover, the use of low-monomer polyisocyanate compositions containing oligomeric polyisocyanates as oligomeric reactants for the trimerization reaction also leads to a novel crosslinking structure in the polyisocyanurate plastic obtainable, which distinguishes it structurally from the materials known from the prior art.

When mention is made here of "solids", this means a body in which complete dissipation of the heat that arises in the trimerization reaction to the environment is impossible because of its volume and, consequently, local hotspots occur within the solid. More particularly, a "solid" as used here is a body having, in its direction of lowest expansion, a thickness of at least 0.5 mm, preferably at least 1 mm, more preferably at least 2 mm. More particularly, a "solid" as used here is not a film or membrane.

A "polyisocyanurate plastic" as used here is a plastic containing polyisocyanurate. It may also consist predominantly or entirely of a polyisocyanurate. Blends of polyisocyanurates and other polymers are likewise covered by the term "polyisocyanurate plastic" as used here.

When reference is made here to "plastic", this means a product which is very substantially dimensionally stable at room temperature—in contrast, for example, to gels or liquids. The term "plastic" as used here encompasses all standard classes of plastic, i.e. especially including thermosets, thermoplastics and elastomers.

A "polyisocyanurate" as used here is any molecule, preferably a polymer, having a plurality of isocyanurate structural units, for example at least ten isocyanurate structural units. A molecule having a single isocyanurate structural unit can be referred to as "isocyanurate".

The characteristic cyclic isocyanate structural unit is shown in the following structural formula:

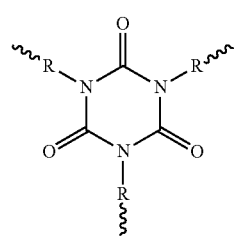

Isocyanurates and polyisocyanurates can be obtained by cyclotrimerization of polyisocyanates. The conventionally operated cyclotrimerization proceeding from monomeric diisocyanates is—as described above—a strongly exothermic reaction. This can considerably restrict the use options and the levels of trimerization that are still achievable industrially and efficiently.

The term "polyisocyanate" as used here is a collective term for compounds containing two or more isocyanate groups in the molecule (this is understood by the person skilled in the art to mean free isocyanate groups of the general structure —N=C=O). The simplest and most important representatives of these polyisocyanates are the diisocyanates. These have the general structure O=C=N—R—N=C=O where R typically represents aliphatic, alicyclic and/or aromatic radicals.

Because of the polyfunctionality (≥2 isocyanate groups), it is possible to use polyisocyanates to prepare a multitude of polymers (e.g. polyurethanes, polyureas and polyisocyanurates) and low molecular weight compounds (for example those having uretdione, isocyanurate, allophanate, biuret, iminooxadiazinedione and/or oxadiazinetrione structure).

When general reference is made here to "polyisocyanates", this means monomeric and/or oligomeric polyisocyanates. For understanding of many aspects of the invention, however, it is important to distinguish between monomeric diisocyanates and oligomeric polyisocyanates. When reference is made here to "oligomeric polyisocyanates", this means polyisocyanates formed from at least two monomeric diisocyanate molecules, i.e. compounds that constitute or contain a reaction product formed from at least two monomeric diisocyanate molecules.

The preparation of oligomeric polyisocyanates from monomeric diisocyanates is also referred to here as modification of monomeric diisocyanates. This "modification" as used here means the reaction of monomeric diisocyanates to give oligomeric polyisocyanates having uretdione, isocyanurate, allophanate, biuret, iminooxadiazinedione and/or oxadiazinetrione structure.

For example, hexamethylene diisocyanate (HDI) is a "monomeric diisocyanate" since it contains two isocyanate groups and is not a reaction product of at least two polyisocyanate molecules:

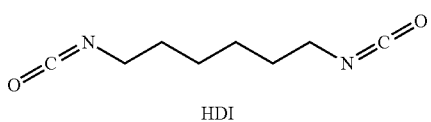

HDI

Reaction products which are formed from at least two HDI molecules and still have at least two isocyanate groups, by contrast, are "oligomeric polyisocyanates" within the context of the invention. Representatives of such "oligomeric polyisocyanates" are, proceeding from monomeric HDI, for example, HDI isocyanurate and HDI biuret, each of which are formed from three monomeric HDI units:

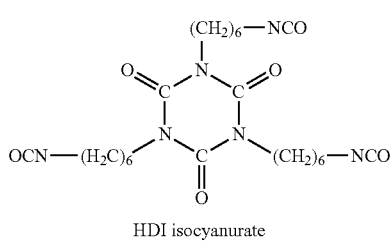

HDI isocyanurate

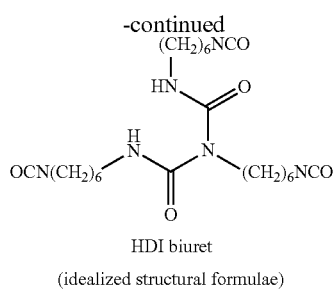

HDI biuret
(idealized structural formulae)

"Polyisocyanate composition A)" in the context of the invention refers to the isocyanate component in the initial reaction mixture. In other words, this is the sum total of all the compounds in the initial reaction mixture that have isocyanate groups. The polyisocyanate composition A) is thus used as reactant in the process of the invention. When reference is made here to "polyisocyanate composition A)", especially to "providing the polyisocyanate composition A)", this means that the polyisocyanate composition A) exists and is used as reactant.

According to the invention, the polyisocyanate composition A) used in the trimerization is low in monomers (i.e. low in monomeric diisocyanates) and contains oligomeric polyisocyanates. It preferably consists mainly of oligomeric polyisocyanates. In one embodiment of the invention, the polyisocyanate composition A) consists entirely or to an extent of 80%, 85%, 90%, 95%, 98%, 99% or 99.5% by weight, based in each case on the weight of the polyisocyanate composition A), of oligomeric polyisocyanates. This content of oligomeric polyisocyanates is based on the polyisocyanate composition A), meaning that they are not formed, for instance, as intermediate during the process of the invention, but are already present in the polyisocyanate composition A) used as reactant on commencement of the reaction.

"Low in monomers" and "low in monomeric diisocyanates" are used synonymously here in relation to the polyisocyanate composition A).

Results of particular practical relevance are established when the polyisocyanate composition A) has a proportion of monomeric diisocyanates in the polyisocyanate composition A) of not more than 20% by weight, especially not more than 15% by weight or not more than 10% by weight, based in each case on the weight of the polyisocyanate composition A). Preferably, the polyisocyanate composition A) has a content of monomeric diisocyanates of not more than 5% by weight, especially not more than 2.0% by weight, more preferably not more than 1.0% by weight, based in each case on the weight of the polyisocyanate composition A). Particularly good results are established when the polymer composition A) is essentially free of monomeric polyisocyanates. "Essentially free" means that the content of monomeric polyisocyanates is not more than 0.5% by weight, based on the weight of the polyisocyanate composition A).

It is essential to the invention that the polyisocyanate composition A) used is a low-monomer composition. In practice, this can especially be achieved by using, as polyisocyanate composition A), oligomeric polyisocyanates whose preparation involves, after the actual modification reaction, at least one further process step in each case for removal of the unconverted excess monomeric diisocyanates. In a manner of particular practical relevance, this monomer removal can be effected by processes known per se, preferably by thin-film distillation under high vacuum or by extraction with suitable solvents that are inert toward isocyanate groups, for example aliphatic or cycloaliphatic hydrocarbons such as pentane, hexane, heptane, cyclopentane or cyclohexane.

In a preferred embodiment of the invention, the polyisocyanate composition A) of the invention is obtained by modifying monomeric diisocyanates with subsequent removal of unconverted monomers.

The processes for producing polyisocyanurate plastics described in the prior art use very substantially monomeric diisocyanates as reactants, meaning that pure monomers or monomer-rich polyisocyanate compositions are catalytically trimerized. By contrast, the inventive use, i.e. the "provision" of a low-monomer polyisocyanate composition A) already containing oligomeric polyisocyanates, surprisingly leads to much lower volume shrinkage. The relatively low exothermicity of the inventive reaction additionally allows polyisocyanurate plastics with a high conversion level to be obtained.

Preferably, no monomeric diisocyanate is used in the trimerization reaction of the invention. In a particular embodiment of the invention, however, the polyisocyanate composition A) may contain an extra monomeric diisocyanate. In this context, "extra monomeric diisocyanate" means that it differs from the monomeric polyisocyanates which have been used for preparation of the oligomeric polyisocyanates present in the polyisocyanate composition A). Addition of extra monomeric diisocyanate may be advantageous for achievement of special technical effects, for example an exceptional hardness. Results of particular practical relevance are established when the polyisocyanate composition A) has a proportion of extra monomeric diisocyanate in the polyisocyanate composition A) of not more than 20% by weight, especially not more than 15% by weight or not more than 10% by weight, based in each case on the weight of the polyisocyanate composition A). Preferably, the polyisocyanate composition A) has a content of extra monomeric diisocyanate of not more than 5% by weight, especially not more than 2.0% by weight, more preferably not more than 1.0% by weight, based in each case on the weight of the polyisocyanate composition A).

In a further particular embodiment of the process of the invention, the polyisocyanate composition A) may contain monomeric monoisocyanates or monomeric isocyanates having an isocyanate functionality greater than two, i.e. having more than two isocyanate groups per molecule. The addition of monomeric monoisocyanates or monomeric isocyanates having an isocyanate functionality greater than two has been found to be advantageous in order to influence the network density of the polyisocyanurate plastic. Results of particular practical relevance are established when the polyisocyanate composition A) has a proportion of monomeric monoisocyanates or monomeric isocyanates having an isocyanate functionality greater than two in the polyisocyanate composition A) of not more than 20% by weight, especially not more than 15% by weight or not more than 10% by weight, based in each case on the weight of the polyisocyanate composition A). Preferably, the polyisocyanate composition A) has a content of monomeric monoisocyanates or monomeric isocyanates having an isocyanate functionality greater than two of not more than 5% by weight, especially not more than 2.0% by weight, more preferably not more than 1.0% by weight, based in each case on the weight of the polyisocyanate composition A). Preferably, no monomeric monoisocyanate or monomeric isocyanate having an isocyanate functionality greater than two is used in the trimerization reaction of the invention.

The low-monomer polyisocyanate composition A) and the oligomeric polyisocyanates present therein are typically obtained by modifying simple aliphatic, cycloaliphatic, araliphatic and/or aromatic monomeric diisocyanates or mixtures of such monomeric diisocyanates.

The oligomeric polyisocyanates may, in accordance with the invention, especially have uretdione, isocyanurate, allophanate, biuret, iminooxadiazinedione and/or oxadiazinetrione structure. In one embodiment of the invention, the oligomeric polyisocyanates have at least one of the following oligomeric structure types or mixtures thereof:

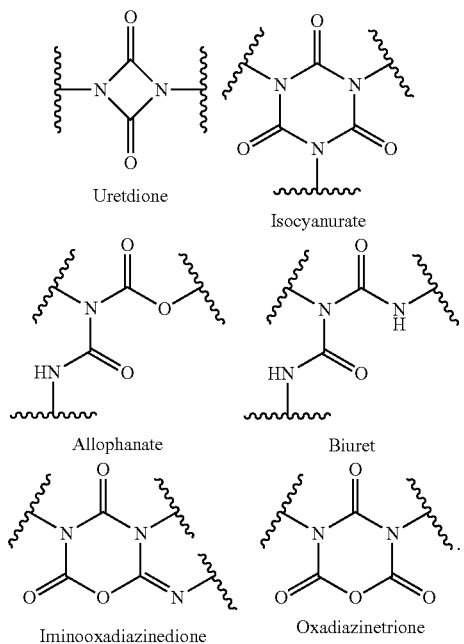

Uretdione

Isocyanurate

Allophanate

Biuret

Iminooxadiazinedione

Oxadiazinetrione

It has been found that, surprisingly, it can be advantageous, for the reaction regime in the trimerization in the production of solids, to use a polyisocyanate composition A) wherein the isocyanurate structure content is at least 50 mol %, based on the sum total of the oligomeric structures from the group consisting of uretdione, isocyanurate, allophanate, biuret, iminooxadiazinedione and oxadiazinetrione structure that are present in the polyisocyanate composition A). Starting mixtures of this kind, especially in comparison with trimerization reactions with polyisocyanate compositions A) wherein the isocyanurate structure content is less than 50 mol % based on the sum total of the oligomeric structures from the group consisting of uretdione, isocyanurate, allophanate, biuret, iminooxadiazinedione and oxadiazinetrione structure present in the polyisocyanate composition A), may be converted at high temperatures exceeding 80° C. and short reaction times of less than 2 h to polyisocyanurate plastics having high conversion levels.

In a preferred embodiment of the invention, a polymer composition A) is used wherein the isocyanurate structure content is at least 60 mol %, preferably 70 mol %, more preferably 80 mol %, especially preferably 90 mol % and particularly 95 mol %, based on the sum total of the oligomeric structures from the group consisting of uretdione, isocyanurate, allophanate, biuret, iminooxadiazinedione and oxadiazinetrione structure present in the polyisocyanate composition A).

In an additional or alternative embodiment, in the process of the invention, a polyisocyanate composition A) is used which, as well as the isocyanurate structure, comprises at least one further oligomeric polyisocyanate having uretdione, biuret, allophanate, iminooxadiazinedione and oxadiazinetrione structure and mixtures thereof.

The proportions of uretdione, isocyanurate, allophanate, biuret, iminooxadiazinedione and/or oxadiazinetrione structure in the polyisocyanates A) can be determined, for example, by NMR spectroscopy. It is possible here with preference to use $^{13}$C NMR spectroscopy, preferably in proton-decoupled form, since the oligomeric structures mentioned give characteristic signals.

Irrespective of the underlying oligomeric structure (uretdione, isocyanurate, allophanate, biuret, iminooxadiazinedione and/or oxadiazinetrione structure), the oligomeric polyisocyanate composition A) for use in the process of the invention and/or the oligomeric polyisocyanates present therein preferably have/has a (mean) NCO functionality of 2.0 to 5.0, preferably of 2.3 to 4.5.

Results of particular practical relevance are established when the polyisocyanate composition A) for use in accordance with the invention has a content of isocyanate groups of 8.0% by weight to 28.0% by weight, preferably of 14.0% to 25.0% by weight, based in each case on the weight of the polyisocyanate composition A).

Preparation processes for the oligomeric polyisocyanates having uretdione, isocyanurate, allophanate, biuret, iminooxadiazinedione and/or oxadiazinetrione structure for use in accordance with the invention in the polyisocyanate composition A) are described, for example, in J. Prakt. Chem. 336 (1994) 185-200, in DE-A 1 670 666, DE-A 1 954 093, DE-A 2 414 413, DE-A 2 452 532, DE-A 2 641 380, DE-A 3 700 209, DE-A 3 900 053 and DE-A 3 928 503 or in EP-A 0 336 205, EP-A 0 339 396 and EP-A 0 798 299.

In an additional or alternative embodiment of the invention, the polyisocyanate composition A) of the invention is defined in that it contains oligomeric polyisocyanates which have been obtained from monomeric diisocyanates, irrespective of the nature of the modification reaction used, with observation of an oligomerization level of 5% to 45%, preferably 10% to 40%, more preferably 15% to 30%. "Oligomerization level" is understood here to mean the percentage of isocyanate groups originally present in the starting mixture which are consumed during the preparation process to form uretdione, isocyanurate, allophanate, biuret, iminooxadiazinedione and/or oxadiazinetrione structures.

Suitable polyisocyanates for preparation of the polyisocyanate composition A) for use in the process of the invention and the oligomeric polyisocyanates present therein are any desired polyisocyanates obtainable in various ways, for example by phosgenation in the liquid or gas phase or by a phosgene-free route, for example by thermal urethane cleavage. Particularly good results are established when the polyisocyanates are monomeric diisocyanates. Preferred monomeric diisocyanates are those having a molecular weight in the range from 140 to 400 g/mol, having aliphatically, cycloaliphatically, araliphatically and/or aromatically bonded isocyanate groups, for example 1,4-diisocyanatobutane (BDI), 1,5-diisocyanatopentane (PDI), 1,6-diisocyanatohexane (HDI), 2-methyl-1,5-diisocyanatopentane, 1,5-diisocyanato-2,2-dimethylpentane, 2,2,4- or 2,4,4-trimethyl-1,6-diisocyanatohexane, 1,10-diisocyanatodecane, 1,3- and 1,4-diisocyanatocyclohexane, 1,4-diisocyanato-3,3,5-trimethylcyclohexane, 1,3-diisocyanato-2-methylcyclohexane, 1,3-diisocyanato-4-methylcyclohexane, 1-isocyanato-3,3,5-trimethyl-5-isocyanatomethylcyclohexane (isophorone diisocyanate; IPDI), 1-isocyanato-1-methyl-4(3)-isocyanatomethylcyclohexane, 2,4'- and 4,4'-diisocyanatodicyclohexylmethane (H12MDI), 1,3- and 1,4-bis(isocyanatomethyl)cyclohexane, bis(isocyanatomethyl) norbornane, 4,4'-diisocyanato-3,3'-dimethyldicyclohexylmethane, 4,4'-diisocyanato-3,3',5,5'-tetramethyldicyclohexylmethane, 4,4'-diisocyanato-1,1'-bi (cyclohexyl), 4,4'-diisocyanato-3,3'-dimethyl-1,1'-bi (cyclohexyl), 4,4'-diisocyanato-2,2',5,5'-tetramethyl-1,1'-bi (cyclohexyl), 1,8-diisocyanato-p-menthane, 1,3-diisocyanatoadamantane, 1,3-dimethyl-5,7-diisocyanatoadamantane, 1,3- and 1,4-bis (isocyanatomethyl)benzene (xylylene diisocyanate; XDI), 1,3- and 1,4-bis(1-isocyanato-1-methylethyl)benzene (TMXDI) and bis(4-(1-isocyanato-1-methylethyl)phenyl) carbonate, 2,4- and 2,6-diisocyanatotoluene (TDI), 2,4'- and 4,4'-diisocyanatodiphenylmethane (MDI), 1,5-diisocyanatonaphthalene and any desired mixtures of such diisocyanates. Further diisocyanates that are likewise suitable can additionally be found, for example, in *Justus Liebigs Annalen der Chemie*, volume 562 (1949) p. 75-136.

Suitable monomeric monoisocyanates which can optionally be used in the polyisocyanate composition A) are, for example, n-butyl isocyanate, n-amyl isocyanate, n-hexyl isocyanate, n-heptyl isocyanate, n-octyl isocyanate, undecyl isocyanate, dodecyl isocyanate, tetradecyl isocyanate, cetyl isocyanate, stearyl isocyanate, cyclopentyl isocyanate, cyclohexyl isocyanate, 3- or 4-methylcyclohexyl isocyanate or any desired mixtures of such monoisocyanates. An example of a monomeric isocyanate having an isocyanate functionality greater than two which can optionally be added to the polyisocyanate composition A) is 4-isocyanatomethyloctane 1,8-diisocyanate (triisocyanatononane; TIN).

In one embodiment of the invention, the polyisocyanate composition A) contains not more than 30% by weight, especially not more than 20% by weight, not more than 15% by weight, not more than 10% by weight, not more than 5% by weight or not more than 1% by weight, based in each case on the weight of the polyisocyanate composition A), of aromatic polyisocyanates. As used here, "aromatic polyisocyanate" means a polyisocyanate having at least one aromatically bonded isocyanate group.

In a preferred embodiment of the process of the invention, a polyisocyanate composition A) having exclusively aliphatically and/or cycloaliphatically bonded isocyanate groups is used.

Aliphatically and cycloaliphatically bonded isocyanate groups are understood to mean isocyanate groups bonded, respectively, to an aliphatic and cycloaliphatic hydrocarbyl radical.

In another preferred embodiment of the process of invention, a polyisocyanate composition A) consisting of or comprising one or more oligomeric polyisocyanates is used, where the one or more oligomeric polyisocyanates has/have exclusively aliphatically and/or cycloaliphatically bonded isocyanate groups.

In a further embodiment of the invention, the polyisocyanate composition A) consists to an extent of at least 70%, 80%, 85%, 90%, 95%, 98% or 99% by weight, based in each case on the weight of the polyisocyanate composition A), of polyisocyanates having exclusively aliphatically and/or cycloaliphatically bonded isocyanate groups. Practical experiments have shown that particularly good results can be achieved with polyisocyanate compositions A) in which the oligomeric polyisocyanates present therein have exclusively aliphatically and/or cycloaliphatically bonded isocyanate groups.

In a particularly preferred embodiment of the process of the invention, a polyisocyanate composition A) is used which consists of or comprises one or more oligomeric polyisocyanates, where the one or more oligomeric polyisocyanates is/are based on 1,4-diisocyanatobutane (BDI), 1,5-diisocyanatopentane (PDI), 1,6-diisocyanatohexane (HDI), isophorone diisocyanate (IPDI) or 4,4'-diisocyanatodicyclohexylmethane (H12MDI) or mixtures thereof.

In a further embodiment of the invention, the proportion of isocyanurate structures in the polyisocyanurate plastic obtained by the process of the invention is at least 20% by weight, based on the weight of the polyisocyanurate plastic. The proportion of isocyanurate structures in the polyisocyanurate plastic obtained can be determined, for example, via solid-state $^{13}C$ NMR.

In a further embodiment of the invention, in the process of the invention, polyisocyanate compositions A) having a viscosity greater than 500 mPas and less than 500 000 mPas, preferably greater than 1000 mPas and less than 300 000 mPas, and more preferably greater than 1000 mPas less than 200 000 mPas, measured to DIN EN ISO 3219 at 21° C., are used.

The polyisocyanurates of the invention are obtainable by catalytic trimerization by the process of the invention. "Catalytic" here means in the presence of a suitable catalyst B).

Suitable catalysts B) for the process of the invention are in principle any compounds which accelerate the trimerization of isocyanate groups to isocyanurate structures. Since isocyanurate formation, depending on the catalyst used, is frequently accompanied by side reactions, for example dimerization to give uretdione structures or trimerization to form iminooxadiazinediones (called asymmetric trimers), and, in the presence of urethane groups in the starting polyisocyanate, by allophanatization reactions, the term "trimerization" in the context of the present invention is also to be used synonymously for these reactions that proceed additionally.

In a particular embodiment, however, trimerization means that predominantly cyclotrimerizations of at least 50%, preferably at least 60%, more preferably at least 70% and especially at least 80% of isocyanate groups present in the polyisocyanate composition A) to give isocyanurate structural units are catalysed. However, side reactions, especially those to give uretdione, allophanate and/or iminooxadiazinedione structures, typically occur and can even be used in a controlled manner in order to advantageously affect, for example, the $T_g$ value of the polyisocyanurate plastic obtained.

Suitable catalysts B) for the process of the invention are, for example, simple tertiary amines, for example triethylamine, tributylamine, N,N-dimethylaniline, N-ethylpiperidine, or N,N'-dimethylpiperazine. Suitable catalysts are also the tertiary hydroxyalkylamines described in GB 2 221 465, for example triethanolamine, N-methyldiethanolamine, dimethylethanolamine, N-isopropyldiethanolamine and 1-(2-hydroxyethyl)pyrrolidine, or the catalyst systems that are known from GB 2 222 161 and consist of mixtures of tertiary bicyclic amines, for example DBU, with simple low molecular weight aliphatic alcohols.

Likewise suitable as trimerization catalysts B) for the process of the invention are a multitude of different metal compounds. Suitable examples are the octoates and naphthenates of manganese, iron, cobalt, nickel, copper, zinc, zirconium, cerium or lead that are described as catalysts in DE-A 3 240 613, or mixtures thereof with acetates of lithium, sodium, potassium, calcium or barium, the sodium and potassium salts of linear or branched alkanecarboxylic acids having up to 10 carbon atoms that are known from DE-A 3 219 608, for example of propionic acid, butyric acid, valeric acid, caproic acid, heptanoic acid, caprylic acid, pelargonic acid, capric acid and undecylenic acid, the alkali metal or alkaline earth metal salts of aliphatic, cycloaliphatic or aromatic mono- and polycarboxylic acids having 2 to 20 carbon atoms that are known from EP-A 0 100 129, for example sodium or potassium benzoate, the alkali metal phenoxides known from GB-A 1 391 066 and GB-A 1 386 399, for example sodium or potassium phenoxide, the alkali metal and alkaline earth metal oxides, hydroxides, carbonates, alkoxides and phenoxides known from GB 809 809, alkali metal salts of enolizable compounds and metal salts of weak aliphatic or cycloaliphatic carboxylic acids, for example sodium methoxide, sodium acetate, potassium acetate, sodium acetoacetate, lead 2-ethylhexanoate and lead naphthenate, the basic alkali metal compounds complexed with crown ethers or polyether alcohols that are known from EP-A 0 056 158 and EP-A 0 056 159, for example complexed sodium or potassium carboxylates, the pyrrolidinone-potassium salt known from EP-A 0 033 581, the mono- or polynuclear complex of titanium, zirconium and/or hafnium known from application EP 13196508.9, for example zirconium tetra-n butoxide, zirconium tetra-2-ethylhexanoate and zirconium tetra-2-ethylhexoxide, and tin compounds of the type described in *European Polymer Journal, vol.* 16, 147-148 (1979), for example dibutyltin dichloride, diphenyltin dichloride, triphenylstannanol, tributyltin acetate, tin octoate, dibutyl(dimethoxy)stannane and tributyltin imidazolate.

Further trimerization catalysts suitable for the process of the invention can be found, for example, in J. H. Saunders and K. C. Frisch, Polyurethanes Chemistry and Technology, p. 94 ff. (1962) and the literature cited therein.

The catalysts B) can be used in the process of the invention either individually or in the form of any desired mixtures with one another.

Preferred catalysts B) are metal compounds of the aforementioned type, especially carboxylates and alkoxides of alkali metals, alkaline earth metals or zirconium, in combination with complexing agents such as crown ethers or polyethylene glycols or polypropylene glycols, and organic tin compounds of the type mentioned.

Particularly preferred trimerization catalysts B) are sodium and potassium salts of aliphatic carboxylic acids having 2 to 20 carbon atoms in combination with complexing agents such as crown ethers or polyethylene glycols or polypropylene glycols, and aliphatically substituted tin compounds.

Very particularly preferred trimerization catalysts B) for the process of the invention are potassium acetate in combination with complexing agents such as crown ethers or polyethylene glycols or polypropylene glycols and/or tin octoate.

In the process of the invention, the trimerization catalyst B) is generally used in a concentration based on the amount of the polyisocyanate composition A) used of 0.0005% to 5.0% by weight, preferably of 0.0010% to 2.0% by weight and more preferably of 0.0015% to 1.0% by weight.

The trimerization catalysts B) that are used in the process of the invention generally have sufficient solubility in the polyisocyanate composition A) in the amounts that are required for initiation of the oligomerization reaction. The catalyst B) is therefore preferably added to the polyisocyanate composition A) in neat form.

Optionally, however, the catalysts B) can also be used dissolved in a suitable organic solvent to improve their incorporability. The dilution level of the catalyst solutions can be freely selected within a very wide range. Catalytically active catalyst solutions are typically those of a concentration over and above about 0.01% by weight.

Suitable catalyst solvents are, for example, solvents that are inert toward isocyanate groups, for example hexane, toluene, xylene, chlorobenzene, ethyl acetate, butyl acetate, diethylene glycol dimethyl ether, dipropylene glycol dimethyl ether, ethylene glycol monomethyl or monoethyl ether acetate, diethylene glycol ethyl and butyl ether acetate, propylene glycol monomethyl ether acetate, 1-methoxyprop-2-yl acetate, 3-methoxy-n-butyl acetate, propylene glycol diacetate, acetone, methyl ethyl ketone, methyl isobutyl ketone, cyclohexanone, lactones such as β-propiolactone, γ-butyrolactone, ε-caprolactone and ε-methylcaprolactone, but also solvents such as N-methylpyrrolidone and N-methylcaprolactam, 1,2-propylene carbonate, methylene chloride, dimethyl sulphoxide, triethyl phosphate or any desired mixtures of such solvents.

If catalyst solvents are used in the process of the invention, preference is given to using catalyst solvents which bear groups reactive toward isocyanates and can be incorporated into the polyisocyanurate plastic. Examples of such solvents are mono- and polyhydric simple alcohols, for example methanol, ethanol, n-propanol, isopropanol, n-butanol, n-hexanol, 2-ethyl-1-hexanol, ethylene glycol, propylene glycol, the isomeric butanediols, 2-ethylhexane-1,3-diol or glycerol; ether alcohols, for example 1-methoxy-2-propanol, 3-ethyl-3-hydroxymethyloxetane, tetrahydrofurfuryl alcohol, ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, diethylene glycol, dipropylene glycol or else liquid higher molecular weight polyethylene glycols, polypropylene glycols, mixed polyethylene/polypropylene glycols and the monoalkyl ethers thereof; ester alcohols, for example ethylene glycol monoacetate, propylene glycol monolaurate, glycerol mono- and diacetate, glycerol monobutyrate or 2,2,4-trimethylpentane-1,3-diol monoisobutyrate; unsaturated alcohols, for example allyl alcohol, 1,1-dimethyl allyl alcohol or oleyl alcohol; araliphatic alcohols, for example benzyl alcohol; N-monosubstituted amides, for example N-methylformamide, N-methylacetamide, cyanoacetamide or 2-pyrrolidone, or any desired mixtures of such solvents.

The polyisocyanurate plastics obtainable by the process of the invention, even as such, i.e. without addition of appropriate auxiliaries and additives C), feature very good light stability. Nevertheless, it is optionally possible to use standard auxiliaries and/or additives C) as well in the production thereof, for example standard fillers, UV stabilizers, antioxidants, mould release agents, water scavengers, slip additives, defoamers, levelling agents, rheology additives, flame retardants and/or pigments. These auxiliaries and/or additives C), excluding fillers and flame retardants, are typically present in the polyisocyanurate plastic in an amount of less than 10% by weight, preferably less than 5% by weight, more preferably up to 3% by weight, based on the polyisocyanate composition A). Flame retardants are typically present in the polyisocyanurate plastic in amounts of not more than 70% by weight, preferably not more than 50% by weight and more preferably not more than 30% by weight, calculated as the total amount of flame retardants used, based on the polyisocyanate composition A).

Suitable fillers $C_w$) are, for example $AlOH_3$, $CaCO_3$, metal pigments such as $TiO_2$ and further known standard fillers. These fillers $C_w$) are preferably used in amounts of not more than 70% by weight, preferably not more than 50% by weight and more preferably not more than 30% by weight, calculated as the total amount of fillers used, based on the polyisocyanate composition A).

Suitable UV stabilizers $C_x$) may preferably be selected from the group consisting of piperidine derivatives, for example 4-benzoyloxy-2,2,6,6-tetramethylpiperidine, 4-benzoyloxy-1,2,2,6,6-pentamethylpiperidine, bis(2,2,6,6-tetramethyl-4-piperidyl) sebacate, bis(1,2,2,6,6-pentamethyl-1-4-piperidinyl) sebacate, bis(2,2,6,6-tetramethyl-4-piperidyl) suberate, bis(2,2,6,6-tetramethyl-4-piperidyl) dodecanedioate; benzophenone derivatives, for example 2,4-dihydroxy-, 2-hydroxy-4-methoxy-, 2-hydroxy-4-octoxy-, 2-hydroxy-4-dodecyloxy- or 2,2'-dihydroxy-4-dodecyloxybenzophenone; benzotriazole derivatives, for example 2-(2H-benzotriazol-2-yl)-4,6-di-tert-pentylphenol, 2-(2H-benzotriazol-2-yl)-6-dodecyl-4-methylphenol, 2-(2H-benzotriazol-2-yl)-4,6-bis(1-methyl-1-phenylethyl)phenol, 2-(5-chloro-2H-benzotriazol-2-yl)-6-(1,1-dimethylethyl)-4-methylphenol, 2-(2H-benzotriazol-2-yl)-4-(1,1,3,3-tetramethylbutyl)phenol, 2-(2H-benzotriazol-2-yl)-6-(1-methyl-1-phenylethyl)-4-(1,1,3,3-tetramethylbutyl)phenol, isooctyl 3-(3-(2H-benzotriazol-2-yl)-5-(1,1-dimethylethyl)-4-hydroxyphenylpropionate), 2-(2H-benzotriazol-2-yl)-4,6-bis(1,1-dimethylethyl)phenol, 2-(2H-benzotriazol-2-yl)-4,6-bis(1-methyl-1-phenylethyl)phenol, 2-(5-chloro-2H-benzotriazol-2-yl)-4,6-bis(1,1-dimethylethyl)phenol; oxalanilides, for example 2-ethyl-2'-ethoxy- or 4-methyl-4'-methoxyoxalanilide; salicylic esters, for example phenyl salicylate, 4-tert-butylphenyl salicylate, 4-tert-octylphenyl salicylate; cinnamic ester derivatives, for example methyl α-cyano-β-methyl-4-methoxycinnamate, butyl α-cyano-β-methyl-4-methoxycinnamate, ethyl α-cyano-β-phenylcinnamate, isooctyl α-cyano-β-phenylcinnamate; and malonic ester derivatives, such as dimethyl 4-methoxybenzylidenemalonate, diethyl 4-methoxybenzylidenemalonate, dimethyl 4 butoxybenzylidenemalonate. These preferred light stabilizers can be used either individually or in any desired combinations with one another.

Particularly preferred UV stabilizers $C_x$) for the polyisocyanurate plastics producible in accordance with the invention are those which fully absorb radiation of wavelength <400 nm. These include, for example, the benzotriazole derivatives mentioned. Especially preferred UV stabilizers are 2-(5-chloro-2H-benzotriazol-2-yl)-6-(1,1-dimethylethyl)-4-methylphenol, 2-(2H-benzotriazol-2-yl)-4-(1,1,3,3-tetramethylbutyl)phenol and/or 2-(5-chloro-2H-benzotriazol-2-yl)-4,6-bis(1,1-dimethylethyl)phenol.

It is optionally possible to add one or more of the UV stabilizers $C_x$) mentioned by way of example to the polyisocyanate composition A), preferably in amounts of 0.001% to 3.0% by weight, more preferably 0.01% to 2% by weight, calculated as the total amount of UV stabilizers used, based on the total weight of the polyisocyanate composition A).

Suitable antioxidants $C_y$) are preferably sterically hindered phenols, which may be selected preferably from the group consisting of 2,6-di-tert-butyl-4-methylphenol (ionol), pentaerythritol tetrakis(3-(3,5-di-tert-butyl-4-hydroxyphenyl)propionate), octadecyl 3-(3,5-di-tert-butyl-4-hydroxyphenyl)propionate, triethylene glycol bis(3-tert-butyl-4-hydroxy-5-methylphenyl)propionate, 2,2'-thiobis(4-methyl-6-tert-butylphenol) and 2,2'-thiodiethyl bis[3-(3,5- di-tert-butyl-4-hydroxyphenyl)propionate]. If required, they can be used either individually or in any desired combinations with one another.

These antioxidants $C_y$) are preferably used in amounts of 0.01% to 3.0% by weight, more preferably 0.02% to 2.0% by weight, calculated as the total amount of antioxidants used, based on the polyisocyanate composition A).

The process of the invention can, apart from the small amounts of any catalyst solvents to be used in addition, be conducted in a solvent-free manner. Especially in the case of the inventive use for production of coatings or films, the polyisocyanate component can optionally also be diluted with organic solvents to reduce the processing viscosity. Solvents suitable for this purpose are, for example, the catalyst solvents that are inert toward isocyanate groups and have already been described above.

In the case of the inventive use for production of films, semi-finished products or mouldings, further auxiliaries and additives C) added, finally, may also be internal mould release agents $C_z$).

These are preferably the nonionic surfactants containing perfluoroalkyl or polysiloxane units that are known as mould release agents, quaternary alkylammonium salts, for example trimethylethylammonium chloride, trimethylstearylammonium chloride, dimethylethylcetylammonium chloride, triethyldodecylammonium chloride, trioctylmethylammonium chloride and diethylcyclohexyldodecylammonium chloride, acidic monoalkyl and dialkyl phosphates having 2 to 18 carbon atoms in the alkyl radical, for example ethyl phosphate, diethyl phosphate, isopropyl phosphate, diisopropyl phosphate, butyl phosphate, dibutyl phosphate, octyl phosphate, dioctyl phosphate, isodecyl phosphate, diisodecyl phosphate, dodecyl phosphate, didodecyl phosphate, tridecanol phosphate, bis(tridecanol) phosphate, stearyl phosphate, distearyl phosphate, and any desired mixtures of such mould release agents.

Particularly preferred mould release agents $C_z$) are the acidic mono- and dialkyl phosphates mentioned, most preferably those having 8 to 12 carbon atoms in the alkyl radical.

Internal mould release agents $C_z$) are used in the process of the invention, if appropriate, preferably in amounts of 0.01% to 3.0% by weight, more preferably 0.02% to 2.0% by weight, calculated as the total amount of internal mould release agent used, based on the polyisocyanate composition A).

In one embodiment of the process of the invention, a trimerization catalyst B) or a mixture of different trimerization catalysts B) is added to the polyisocyanate composition A) described, optionally under inert gas, for example nitrogen, and optionally with additional use of the aforementioned solvents and auxiliaries and additives C), and mixed in homogeneously with the aid of a suitable mixing unit. The addition of catalyst B) and any solvent for additional use and auxiliaries and additives C) can take place in any sequence, successively or in a mixture, in the above-specified amounts and generally at a temperature of 0 to 100° C., preferably of 15 to 80° C., more preferably of 20 to 60° C. In a particular embodiment of the invention, the reaction mixture thus obtained has a pot life, defined as the time span from the mixing of the polyisocyanate composition A) with the trimerization catalyst B) until the time at which the viscosity of the reaction mixture is twice the starting value, of greater than 10 min at 23° C. This assures both reliable miscibility and reliable and simple processing without the risk of a reaction that proceeds in an uncontrolled manner with significant evolution of heat.

In an embodiment of the invention of particular practical relevance, the polyisocyanate composition A) and also the mixture of catalyst B) and polyisocyanate composition A) are degassed by customary methods prior to the reaction. Preferably, the polyisocyanate composition A) of the invention and/or else the mixture of catalyst B) and polyisocyanate composition A) is carefully degassed prior to the reaction at temperatures between 10 and 100° C.

For production of solid bodies, for example semi-finished products or mouldings, reaction mixtures comprising the catalyst B) and the polyisocyanate composition A) may be introduced into open or closed moulds, for example by simple manual pouring, or with the aid of suitable machinery, for example the low-pressure or high-pressure machinery which is standard in polyurethane technology.

Subsequently, the trimerization reaction can be started by heating the filled moulds, the optimal mould or ambient temperature, depending on the catalyst chosen in each case, being 20 to 250° C., preferably from 40 to 200° C., more preferably from 100 to 190° C. Particularly advantageously, it is possible to conduct the trimerization at temperatures above the glass transition point of the desired products. In a particular embodiment of the invention, the temperature of the reaction mixture in the course of the reaction reaches more than 80° C. but remains below 300° C., even locally. In a further preferred embodiment, the melt temperature during the catalytic trimerization in the course of the process of the invention reaches at least one value above the $T_g$ of the polyisocyanurate plastic obtained.

The term "melt" refers to reaction mixture during the curing process. The term "melt temperature" refers to the temperature of the reaction mixture during the curing process. It is not to be mistaken as the melting point of the reaction product.

The glass transition temperatures ($T_g$) reported here can be determined by means of dynamic differential calorimetry in accordance with DIN EN 61006, Method A, using a DSC instrument calibrated with indium and lead, and conducting three immediately successive heating runs from −50° C. to +200° C., heating rate 20 K/min, with subsequent cooling at a cooling rate of 320 K/min, and using the first heating curve to determine the values, and determining the temperature at half the height of a glass transition step as $T_g$.

Especially in the case of solids or thick-layered mouldings, the reaction temperature has an adiabatic component which can lead to temperature spikes in the reaction material of +5 to +100° C. compared to the set reaction temperature (i.e. ambient temperature). The adiabatic component is understood to mean the reaction enthalpy which is not released to the environment by a heat transfer but leads to a temperature increase and acceleration of the reaction in the trimerization mixture. The process of the invention takes place under at least partly adiabatic conditions, and for that reason the melt temperature differs by at least 10° C. from the mould or ambient temperature. The melt temperature may differ especially by at least 20° C., 25° C., 50° C. or up to 100° C. from the mould or ambient temperature.

Depending on the catalyst B) chosen and the reaction temperature chosen, the trimerization reaction is very substantially complete, as defined below, after a period of less than one minute up to several hours. In practice, it has been found that the trimerization reaction at reaction temperatures of greater than 80° C. is typically very substantially complete within less than 2 h. When "reaction temperatures" are being discussed here, this means the ambient temperature. In a preferred embodiment of the invention, the trimerization reaction at a reaction temperature of greater than 80° C. is complete within less than 1 h, more preferably fewer than 45 min and most preferably fewer than 30 min. The progress of the reaction can initially still be determined by titrimetric determination of the NCO content, but gelation and solidification of the reaction mixture sets in rapidly with advancing conversion, which makes wet-chemical analysis methods impossible. The further conversion of isocyanate groups can then only be monitored by spectroscopic methods, for example by IR spectroscopy with reference to the intensity of the isocyanate band at about 2270 $cm^{-1}$.

In a preferred embodiment of the present invention, the trimerization reaction is completed in less than 1 hour, wherein the peak temperature within the melt is preferably at least 10° C., more preferably at least 50° C., even more preferably at least 75° C., even more preferably at least 100° C., even more preferably at least 150° C. and most preferably at least 200° C. higher than the ambient temperature.

In another preferred embodiment of the present invention, the trimerization reaction is completed in less than 30 minutes, wherein the peak temperature within the melt is preferably at least 10° C., more preferably at least 50° C., even more preferably at least 75° C., even more preferably at least 100° C., even more preferably at least 150° C. and most preferably at least 200° C. higher than the ambient temperature.

In yet another preferred embodiment of the present invention, the trimerization reaction is completed in less than 15 minutes, wherein the peak temperature within the melt is preferably at least 10° C., more preferably at least 50° C., even more preferably at least 75° C., even more preferably at least 100° C., even more preferably at least 150° C., and most preferably at least 200° C. higher than the ambient temperature.

In yet another preferred embodiment of the present invention, the trimerization reaction is completed in less than 5 minutes, wherein the peak temperature within the melt is preferably at least 10° C., more preferably at least 50° C., even more preferably at least 75° C., even more preferably at least 100° C., even more preferably at least 150° C., and most preferably at least 200° C. higher than the ambient temperature.

In yet another preferred embodiment of the present invention, the trimerization reaction is completed in less than 2 minutes, wherein the peak temperature within the melt is preferably at least 10° C., more preferably at least 50° C., even more preferably at least 75° C., even more preferably at least 100° C., even more preferably at least 150° C., and most preferably at least 200° C. higher than the ambient temperature. The polyisocyanurate plastics of the invention are preferably polyisocyanurates with high conversion, i.e. those in which the trimerization reaction to give polyisocyanurate structures is very substantially complete. A trimerization reaction to give polyisocyanurate structures can be regarded as "very substantially complete" in the context of the present invention when at least 80%, preferably at least 90% and more preferably at least 95% of the free isocyanate groups originally present in the polyisocyanate composition A) have reacted. In other words, preferably only at most 20%, at most 10% and more preferably at most 5% of the isocyanate groups originally present in the polyisocyanate composition A) are present in the polyisocyanurate plastic of the invention. This can be achieved by conducting the catalytic trimerization in the process of the invention at least up to a conversion level at which only, for example, at most 20% of the isocyanate groups originally present in the polyisocyanate composition A) are present, such that a polyisocyanurate with high conversion is obtained. The percentage of isocyanate groups still present can be determined by a comparison of the content of isocyanate groups in % by weight in the original polyisocyanate composition A) with the content of isocyanate groups in % by weight in the reaction product, for example by the aforementioned comparison of the intensity of the isocyanate band at about 2270 $cm^{-1}$ by means of IR spectroscopy.

In a preferred embodiment, the total content of extractable isocyanate-containing compounds in the polyisocyanurate plastic of the invention, based on the polyisocyanate composition A) used, is less than 1% by weight. The total content of extractable isocyanate-containing compounds can be effected in a particularly practicable manner by methods known per se, preferably by extraction with suitable solvents that are inert toward isocyanate groups, for example aliphatic or cycloaliphatic hydrocarbons such as pentane, hexane, heptane, cyclopentane, cyclohexane, toluene or xylene and subsequent determination of the isocyanate group content in the extract, for example by IR spectroscopy.

In another preferred embodiment, the polyisocyanurate plastics of the invention have a b* value determined in accordance with DIN 5033 in the L*a*b* colour space of less than 15, preferably less than 10. Every colour in the L*a*b* colour space is defined by a colour locus having the Cartesian coordinates {L*, a*, b*}. The L* axis describes the brightness (luminance) of the colour with values of 0 to 100. The a* axis describes the green or red component of a colour, negative values representing green and positive values representing red. The b* axis describes the blue or yellow component of a colour, negative values representing blue and positive values representing yellow. Relatively high positive b* values therefore indicate significant yellowing which is unwanted for many applications.

The polyisocyanurate plastics obtainable by the process of the invention can advantageously be surface functionalized by methods known to those skilled in the art. This can be accomplished, for example, via coating methods or reactive functionalization, in either case with or without primer.

With the process of the invention, it is possible in a very efficient manner to obtain homogeneous, blister-free solids made from polyisocyanurate plastic. The degree of freedom of a solid from blisters can be specified via the density. The inventive solids made from polyisocyanurate plastic especially feature a density of greater than 1.00 $g/cm^3$, determined in accordance with DIN EN ISO 1183-1. The process of the invention especially affords solids having a density of greater than 1.10 $g/cm^3$, preferably greater than 1.15 $g/cm^3$.

The process of the invention affords transparent, yellowing-stable polyisocyanurate plastics which, according to the nature of the polyisocyanate composition A) used, as well as isocyanurate structures, optionally contain further oligomeric structures and feature excellent thermal stabilities.

The process of the invention enables, in a simple manner, synthesis of solids made from polyisocyanurate plastics with a high conversion level at high temperatures with short reaction times by suitable selection of starting polyisocyanates.

By contrast with polyisocyanurate plastics which have been produced proceeding from monomeric diisocyanates, for example HDI, the process products of the invention are notable, for example, for a different glass transition temperature ($T_g$) and considerably lower volume shrinkage during the curing, and for that reason they are especially suitable for manufacturing ultrahigh-precision mouldings. The comparatively low heat of reaction released also permits the problem-free production of solid large-volume mouldings without extreme local overheating, which typically leads to inhomogeneity, side reactions, and hence to discolouration, and blisters.

The invention is elucidated in detail hereinafter with reference to examples.

EXAMPLES

All percentages are based on weight, unless stated otherwise.

The pot life was measured after removal of a 1 ml sample from the freshly mixed reaction mixture in a Physica MCR 51 rheometer at RT. The pot life has been attained when the starting viscosity has doubled.

The NCO contents were determined by titrimetric means to DIN EN ISO 11909.

All the viscosity measurements were made with a Physica MCR 51 rheometer from Anton Paar Germany GmbH (DE) to DIN EN ISO 3219.

The densities of the starting polyisocyanates were determined to DIN EN ISO 2811, and those of the cured polyisocyanurate plastics to DIN EN ISO 1183-1.

The glass transition temperature $T_g$ was determined by means of DSC (differential scanning calorimetry) with a Mettler DSC 12E (Mettler Toledo GmbH, Giessen, Germany) in accordance with DIN EN 61006. Calibration was effected via the melt onset temperature of indium and lead. 10 mg of substance were weighed out in standard capsules. The measurement was effected by three heating runs from −50° C. to +200° C. at a heating rate of 20 K/min with subsequent cooling at a cooling rate of 320 K/min. Cooling was effected by means of liquid nitrogen. The purge gas used was nitrogen. The values reported in the table below are each based on the evaluation of the 1st heating curve, since changes in the sample in the measurement process at high temperatures are possible in the reactive systems being examined as a result of the thermal stress in the DSC. The glass transition temperature $T_g$ determined was the temperature at half the height of a glass transition step.

Shore hardnesses were measured to DIN 53505 with the aid of a Zwick 3100 Shore hardness tester (from Zwick, Germany) at 23° C. and 50% air humidity.

The contents (mol %) of the uretdione, isocyanurate, allophanate, biuret, iminooxadiazinedione and/or oxadiazinetrione structures present in the starting polyisocyanates were calculated from the integrals of proton-decoupled $^{13}C$ NMR spectra (recorded on a Bruker DPX-400 instrument) and are each based on the sum total of uretdione, isocyanurate, allophanate, biuret, iminooxadiazinedione and/or oxadiazinetrione structures present.

In the case of HDI polyisocyanates, the individual structural elements have the following chemical shifts (in ppm): uretdione: 157.1; isocyanurate: 148.4; allophanate: 155.7 and 153.8, biuret: 155.5; iminooxadiazinedione: 147.8, 144.3 and 135.3; oxadiazinetrione: 147.8 and 143.9.

IR spectra were recorded on a Spectrum Two FT-IR spectrometer equipped with an ATR unit from Perkin Elmer, Inc.

Transmittance was measured with a Byk-Gardner hazegard plus instrument according to ASTM D1003 on specimens of thickness 4 mm.

Discolourations were measured in accordance with DIN 5033 Part 7 on a CM-5 spectrophotometer using specimens of thickness 4 mm without gloss at a viewing angle of 8° and with diffuse illumination.

Extractable isocyanates were determined after coarse comminution of the 4 mm specimen into fragments having a volume of less than 0.5 cm$^3$. 10 g were taken from this in the form of the comminuted fragments and extracted with 50 ml of PA quality toluene with stirring at 23° C. over the course of 24 h. The extract was filtered and examined for extractable components against the toluene used for the extraction by means of GC/MS/EI testing. The concentration figures result from a GC flame ionization detection (FID); the compounds found in the GC were identified by means of MS spectroscopy. The injection volumes were 0.2 microlitre; the method 2301-0291701-04D of the supplier Currenta GmbH & Co. OHG was used.

Process of the Invention 100 g of the starting polyisocyanate are weighed into a polypropylene cup together with a catalyst mixture consisting of 0.177 g of potassium acetate, 0.475 g of [18]crown-6 and 3.115 g of diethylene glycol (sourced from Sigma-Aldrich in PA qualities and used as supplied), and homogenized at 2750 rpm with the aid of a Speed-Mixer DAC 150 FVZ (from Hauschild, Germany) for 1 min. 16 g of the contents of each polypropylene cup are weighed into an aluminium dish of diameter 6.3 cm and depth 1 cm which, for better demoulding, had previously been rubbed with 1% soya lecithin W250 in ethyl acetate solution and dried. The aluminium dish thus filled is heated in a drying cabinet at 180° C. for 15 min. Under these conditions, the trimerization reaction proceeds under partly adiabatic conditions, such that the temperature of the "specimen" is temporarily increased by at least 10° C. compared to the outside temperature. After cooling to room temperature, the specimen is demoulded. Specimens of thickness about 0.4 cm are obtained, which slightly increase in thickness toward the beaker edge.

The process of the invention is employed for production both of inventive and noninventive polyisocyanurate plastics.

All the polyisocyanates used were sourced from Bayer Material Science AG, Leverkusen, Germany, and are either commercially available or can be prepared by methods described in the patent literature on the basis of readily available monomers and catalysts.

Starting Compounds:

Inventive Starting Polyisocyanate A

HDI polyisocyanate containing isocyanurate groups, prepared in accordance with Example 11 of EP-A 330 966, with the alteration that the catalyst solvent used was 2-ethylhexanol rather than 2-ethylhexane-1,3-diol. The reaction was stopped at an NCO content of the crude mixture of 42% by adding dibutyl phosphate. Subsequently, unconverted HDI was removed by thin-film distillation at a temperature of 130° C. and a pressure of 0.2 mbar.

NCO content: 23.0%
NCO functionality: 3.2
Monomeric HDI: 0.1%
Viscosity (23° C.): 1200 mPas
Density (20° C.): 1.17 g/cm$^3$
Distribution of the oligomeric structure types:
Isocyanurate: 89.7 mol %
Iminooxadiazinedione 2.5 mol %
Uretdione 2.7 mol %
Allophanate: 5.1 mol %

Inventive Starting Polyisocyanate B

HDI polyisocyanate containing isocyanurate groups, prepared in accordance with Example 11 of EP-A 330 966. The reaction was stopped at an NCO content of the crude mixture of 40% by adding dibutyl phosphate. Subsequently, unconverted HDI was removed by thin-film distillation at a temperature of 130° C. and a pressure of 0.2 mbar.

NCO content: 21.8%
NCO functionality: 3.4
Monomeric HDI: 0.1%
Viscosity (23° C.): 3000 mPas
Density (20° C.): 1.17 g/cm³
Distribution of the oligomeric structure types:
Isocyanurate: 84.5 mol %
Iminooxadiazinedione 5.4 mol %
Uretdione 2.9 mol %
Allophanate: 7.2 mol %
Inventive Starting Polyisocyanate C Isophorone diisocyanate (IPDI), in accordance with Example 2 of EP-A 0 003 765, was trimerized down to an NCO content of 31.1% and the excess IPDI was removed by thin-film distillation at 170° C./0.1 mbar. This gave an isocyanurate polyisocyanate as a virtually colourless solid resin having a melting range of 100 to 110° C.
NCO content: 16.4%
NCO functionality: 3.3
Monomeric IPDI: 0.2%

70 parts by weight of the solid IPDI polyisocyanurate were coarsely comminuted and initially charged in a reaction vessel at room temperature together with 30 parts by weight of the starting polyisocyanate A1) under an N₂ atmosphere. To dissolve the solid resin and homogenize the mixture, it was heated to 100-140° C. and stirred until a virtually clear solution was obtained. Subsequently, the mixture was cooled to 50° C. and filtered through a 200µ filter.
NCO content: 21.2%
NCO functionality: 3.2
Monomeric IPDI: 0.1%
Monomeric HDI: 0.1
Distribution of the oligomeric structure types:
Isocyanurate: 92.1 mol %
Iminooxadiazinedione 1.8 mol %
Uretdione 1.9 mol %
Allophanate: 4.2 mol %
Inventive Starting Polyisocyanate D The starting polyisocyanate D used was a mixture of 95% by weight of starting isocyanate B and 5% by weight of hexamethylene diisocyanate (HDI).
Inventive Starting Polyisocyanate E The starting isocyanate E used was a mixture of 90% by weight of starting isocyanate B and 10% by weight of butanediol.
Noninventive Starting Polyisocyanate F HDI polyisocyanate containing biuret groups, prepared in accordance with the process of EP-A 0 150 769 by reacting 8.2 mol of HDI with 1.0 mol of water in the presence of 0.05 mol of pivalic anhydride at a temperature of 125° C. On attainment of an NCO content of 36.6%, unconverted HDI was removed together with pivalic anhydride by thin-film distillation at a temperature of 130° C. and a pressure of 0.2 mbar.
NCO content: 23.0%
NCO functionality: 3.2
Monomeric HDI: 0.4%
Viscosity (23° C.): 2,500 mPas
Density (20° C.): 1.13 g/cm³
Distribution of the oligomeric structure types:
Biuret: 87.7 mol %
Noninventive Starting Polyisocyanate G HDI polyisocyanate containing isocyanurate and uretdione groups, prepared by tributylphosphine-catalysed oligomerization in accordance with Example 1a) of EP-A 0 377 177, with the alteration that no 2,2,4-trimethylpentane-1,3-diol was used. The reaction was stopped at an NCO content of 42%, and unconverted HDI was removed by thin-film distillation at a temperature of 130° C. and a pressure of 0.2 mbar.
NCO content: 22.7%
NCO functionality: 2.2
Monomeric HDI: 0.3%
Viscosity (23° C.): 90 mPas
Density (20° C.): 1.13 g/cm³
Distribution of the oligomeric structure types:
Isocyanurate: 15.6 mol %
Iminooxadiazinedione 6.3 mol %
Uretdione 78.1 mol %
Noninventive Starting Polyisocyanate H HDI polyisocyanate containing isocyanurate and iminooxadiazinedione groups, prepared in accordance with Example 4 of EP-A 0 962 455, by trimerization of HDI using a 50% solution of tetrabutylphosphonium hydrogendifluoride in isopropanol/methanol (2:1) as catalyst. The reaction was stopped at an NCO content of the crude mixture of 43% by adding dibutyl phosphate. Subsequently, unconverted HDI was removed by thin-film distillation at a temperature of 130° C. and a pressure of 0.2 mbar.
NCO content: 23.4%
NCO functionality: 3.2
Monomeric HDI: 0.2%
Viscosity (23° C.): 700 mPas
Density (20° C.): 1.15 g/cm3
Distribution of the oligomeric structure types:
Isocyanurate: 49.9 mol %
Iminooxadiazinedione 45.3 mol %
Uretdione 4.8 mol %
Noninventive Starting Polyisocyanate I The starting polyisocyanate I used was hexamethylene diisocyanate (available from Bayer Material Science AG, Leverkusen, Germany as Desmodur H).
Noninventive Starting Polyisocyanate J The starting polyisocyanate J used was a polyisocyanate containing exclusively urethane structure (available as Desmodur XP 2617 from Bayer Material Science AG, Leverkusen, Germany).
NCO content: 12.5%
NCO functionality: 2.1
Monomeric HDI: <0.5%
Viscosity (23° C.): 4250 mPas
Density (20° C.): 1.09 g/cm³
Distribution of the oligomeric structure types:
Isocyanurate: 0 mol %
Urethane: 100 mol %

The table which follows shows characteristic properties of the polyisocyanurate plastics obtained or products of the process of the invention based on inventive (A-E) and noninventive (F-J)* starting polyisocyanates.

| Starting polyisocyanate | Pot life/ [min] | Density [g/cm³] | T_g [°C.] | Transmittance [%] | L | a | b | Hardness Shore D | Residual isocyanate by IR [%] | Extractable isocyanates (GC/MS) [%] | Observation/ explanation |
|---|---|---|---|---|---|---|---|---|---|---|---|
| A | >10 | 1.18 | 109 | 83 | 94 | 0.2 | 6.5 | 72 | <5% | 0% | Extractable fractions |
| B | >10 | 1.19 | 106 | 83 | 96 | 0.1 | 5.9 | 73 | <5% | 0% | <0.3% found and |
| C | >10 | 1.18 | 171 | 85 | 94 | −0.4 | 5.8 | 87 | <10% | 0% | identified in the |
| D | >10 | 1.17 | 108 | 81 | 93 | 0.1 | 7.1 | 84 | <5% | 0% | GC/MS spectrum |
| E | >10 | 1.28 | 53 | 85 | 98 | −0.1 | 4.0 | 82 | <5% | 0% | come from the trimerization catalyst used. |
| F* | >10 | — | — | — | — | — | — | — | >20% | 100% | Remains liquid, significant yellowing |
| G* | >10 | — | — | — | — | — | — | — | >20% | 100% | Remains liquid, significant yellowing |
| H* | >10 | — | — | — | — | — | — | — | >20% | >50% | Remains gel-like/viscous - slight yellowing |
| I* | <10 | <0.5 | — | — | — | — | — | — | — | >5% | Reaction starts immediately after mixing at RT, forming a brown-black discoloured foam, with temperatures of up to 250° C. measured by means of an IR camera. |
| J* | >10 | 1.08 | 19 | 88 | 95 | −7.2 | 25.3 | 38 | <5% | 0% | Very soft material with significant yellowing |

*comparative experiments

The results in the table show that the polyisocyanurate plastics of the invention based on the inventive starting polyisocyanates A-E which have been produced by the process of the invention, by contrast with the noninventive products produced on the basis of the noninventive starting polyisocyanates F*-I*, feature a low level of extractable isocyanate-containing components. For the processing of the inventive starting polyisocyanates, important pot lives of more than 10 min are obtained, and the resulting polyisocyanurate plastics exhibit good mechanical properties and thermal stability, which are indicated by a hardness of greater than 50 Shore D and a T_g well above 40° C., i.e. well above room temperature. Inventive polyisocyanurate plastics from the process of the invention, by comparison with the noninventive products made from the starting polyisocyanates F*-J*, additionally feature b* values of less than 15 in the L*a*b* colour space and hence a desirable negligibly low discolouration.

The noninventive products, which either remain liquid, break down during the reaction and have a distinct yellow colour or cure in an uncontrolled and incomplete manner to give foams having a density of less than 1 g/cm³, are entirely unsuitable for the desired use for production of homogeneous high-quality solids.

The invention claimed is:

1. A process for producing solids made from polyisocyanurate plastics, comprising the following steps:
   a) providing a polyisocyanate composition A) which contains oligomeric polyisocyanates and has a content of monomeric polyisocyanates of not more than 20% by weight based on the weight of the polyisocyanate composition having an isocyanurate structure content in the polyisocyanate composition A) of at least 50 mol %, based on the sum total of the oligomeric structures from the group consisting of uretdione, isocyanurate, allophanate, biuret, iminooxadiazinedione and oxadiazinetrione structure that are present in the polyisocyanate composition A);
   b) catalytically trimerizing the polyisocyanate composition A), where
      (i) the catalytic trimerization is conducted at a temperature of at least 80° C.;
      (ii) the catalytic trimerization is conducted within less than 2 hours at least up to a conversion level at which only at most 20% of the isocyanate groups originally present in the polyisocyanate composition A) are present;
      (iii) the catalytic trimerization takes place under quasi-adiabatic conditions which are characterized in that the polyisocyanate composition having a material temperature at least one juncture of at least 10° C. above ambient temperature.

2. The process according to claim 1, wherein the material temperature during the catalytic trimerization reaches at least one temperature above the T_g of the polyisocyanurate plastic obtained.

3. The process according to claim 1, wherein the catalytic trimerization is conducted within less than 1 hour at least up to the conversion level specified in step b) (ii).

4. The process according to claim 1, wherein the conversion level specified in step b) (ii) is a conversion level at which only at most 10% of the isocyanate groups originally present in the polyisocyanate composition A) are present.

5. The process according to claim 1, wherein the conversion level specified in step b) (ii) is a conversion level at which only at most 5% of the isocyanate groups originally present in the polyisocyanate composition A) are present.

6. The process according to claim 1, wherein the polyisocyanate composition A) consists of at least 80% by weight, based on the weight of the polyisocyanate composition A), of polyisocyanates having exclusively aliphatically and/or cycloaliphatically bonded isocyanate groups.

7. The process according to claim 1, wherein the polyisocyanate composition A) consists of at least 95% by weight, based on the weight of the polyisocyanate composition A), of polyisocyanates having exclusively aliphatically and/or cycloaliphatically bonded isocyanate groups.

8. The process according to claim 1, wherein the polyisocyanate composition A) consists of 100% by weight, based on the weight of the polyisocyanate composition A), of polyisocyanates having exclusively aliphatically and/or cycloaliphatically bonded isocyanate groups.

9. The process according to claim 1, wherein the oligomeric polyisocyanates consist of one or more oligomeric polyisocyanates formed from 1,4-diisocyanatobutane, 1,5-diisocyanatopentane, 1,6-diisocyanatohexane, isophorone diisocyanate or 4,4'-diisocyanatodicyclohexylmethane or mixtures thereof.

10. The process according to claim 1, wherein the polyisocyanate composition A) and/or the oligomeric polyisocyanates have/has a mean NCO functionality of 2.0 to 5.0.

11. The process according to claim 1, wherein the polyisocyanate composition A) has a content of reactive isocyanate groups of 8% to 28% by weight, based on the weight of the polyisocyanate composition A).

12. Process according to claim 1, wherein said low in monomeric polyisocyanates means that the polyisocyanate composition A) has a content of monomeric polyisocyanates of not more than 20% by weight based on the weight of the polyisocyanate composition A).

13. The process according to claim 1, wherein said low in monomeric polyisocyanates means that the polyisocyanate composition A) has a content of monomeric polyisocyanates of not more than 5% by weight, based on the weight of the polyisocyanate composition A).

14. The process according to claim 1, wherein the proportion of isocyanurate structures in the polyisocyanurate plastic obtained is at least 20% by weight, based on the weight of the polyisocyanurate plastic.

15. A solid made from polyisocyanurate plastic, obtainable by the process according to claim 1.

16. The solid according to claim 15, wherein the polyisocyanurate plastic has a b* value determined in accordance with DIN 5033 in the L*a*b* colour space of less than 15.

17. The solid according to claim 15, wherein the polyisocyanurate plastic has a density of greater than 1.00 g/cm$^3$.

* * * * *